(12) United States Patent
Löffler et al.

(10) Patent No.: US 11,188,146 B2
(45) Date of Patent: Nov. 30, 2021

(54) DIRECT VOLUME RENDERING IN VIRTUAL AND/OR AUGMENTED REALITY

(71) Applicant: ARIVIS AG, Munich (DE)

(72) Inventors: Falko Löffler, Graal-Müritz (DE); Paul Bönisch, Rostock (DE); Christian Götze, Rostock (DE); Andreas Suchanek, Pfaffenhofen a.d. Ilm (DE)

(73) Assignee: Arivis AG, Munich (DE)

( * ) Notice: Subject to any disclaimer, the term of this patent is extended or adjusted under 35 U.S.C. 154(b) by 0 days.

(21) Appl. No.: 16/418,278

(22) Filed: May 21, 2019

(65) Prior Publication Data

US 2019/0272027 A1    Sep. 5, 2019

Related U.S. Application Data

(63) Continuation-in-part of application No. 15/295,690, filed on Oct. 17, 2016, now Pat. No. 10,319,147.
(Continued)

(51) Int. Cl.
*G06F 3/01* (2006.01)
*G06T 15/08* (2011.01)
(Continued)

(52) U.S. Cl.
CPC .............. *G06F 3/012* (2013.01); *G06T 15/06* (2013.01); *G06T 15/08* (2013.01)

(58) Field of Classification Search
None
See application file for complete search history.

(56) References Cited

U.S. PATENT DOCUMENTS

2002/0177771 A1    11/2002   Guttman et al.
2003/0234781 A1    12/2003   Laidlaw et al.
(Continued)

FOREIGN PATENT DOCUMENTS

WO    2017064689 A1    4/2017

OTHER PUBLICATIONS

Kajiya, J., "The rendering equation", Siggraph 1986, pp. 143 to 150 (1989).
(Continued)

*Primary Examiner* — Yingchun He
(74) *Attorney, Agent, or Firm* — Falk Ewers; Ewers IP Law PLLC

(57) ABSTRACT

A method for rendering an image in a virtual reality environment includes capturing volume data with a capturing device, storing the volume data in a memory, detecting a movement of a user with a tracking device, generating tracking data representing the movement of the user, setting rendering parameters for rendering the image, rendering the image from the volume data based on the rendering parameters, detecting a measure of the movement of the user based on the tracking data, and adapting the rendering parameters depending on the measure of the movement of the user. A system for rendering the image includes a tracking device, a communication interface, a memory, and a processor which sets rendering parameters, renders the image from the volume data based on the rendering parameters, detects a measure of the movement of the user, and adapts the rendering parameters depending on the measure of the movement.

20 Claims, 8 Drawing Sheets

Related U.S. Application Data

(60) Provisional application No. 62/243,011, filed on Oct. 17, 2015.

(51) Int. Cl.
  *G06T 15/06* (2011.01)
  *H04N 13/344* (2018.01)
  *H04N 13/366* (2018.01)
  *H04N 13/279* (2018.01)
  *H04N 13/383* (2018.01)

(56) References Cited

U.S. PATENT DOCUMENTS

| | | | |
|---|---|---|---|
| 2004/0125103 A1* | 7/2004 | Kaufman | G06T 15/40 345/419 |
| 2004/0254763 A1 | 12/2004 | Sakai et al. | |
| 2006/0007244 A1 | 1/2006 | Matsumoto | |
| 2006/0256111 A1 | 11/2006 | Chihoub et al. | |
| 2009/0040220 A1 | 2/2009 | Gibbs et al. | |
| 2012/0256939 A1* | 10/2012 | Kulla | G06T 15/506 345/589 |
| 2013/0179112 A1* | 7/2013 | Ma | G01C 21/206 702/141 |
| 2015/0208039 A1* | 7/2015 | Kuga | A61B 8/0891 348/46 |
| 2016/0191887 A1* | 6/2016 | Casas | H04N 13/279 348/47 |
| 2016/0358336 A1* | 12/2016 | Franz | G06T 7/35 |
| 2017/0294042 A1 | 10/2017 | Engel | |

OTHER PUBLICATIONS

Watt, A. et al. "Advanced Animation and Rendering Techniques: Theory and Practice", Addison-Wesley Professional, pp. 293 to 295 (1992).

Lafortune, E., "Mathematical models and Monte Cado algorithms for physically based rendering," Department of Computer Science, Faculty of Engineering, Katholieke Universiteit Leuven, pp. 74-79 (1996).

Pharr, M. et al. "Physically based rendering: From theory to implementation", Morgan Kaufmann, 1233 pages (2016).

* cited by examiner

DIRECT VOLUME RENDERING IN VIRTUAL AND/OR AUGMENTED REALITY

CROSS REFERENCE TO RELATED APPLICATIONS

This application is a continuation-in-part of U.S. patent application Ser. No. 15/295,690 filed Oct. 17, 2016, which claims the benefit of U.S. Provisional Patent Application No. 62/243,011 filed Oct. 17, 2015, the entire contents of which are hereby incorporated by reference.

TECHNICAL FIELD

This application generally relates to rendering of images for visualization in electronic displays. In particular the methods and systems claimed herein relate to rendering an image in a virtual reality environment.

BACKGROUND

Virtual reality and augmented reality have demanding visualization requirements to provide highly realistic user experiences. Environments with highly variable three-dimensional features present additional challenges. Hardware processing techniques that attempt to address these challenges increase costs and size substantively, while generally encumbering the user to maintain proximity to computing systems with sufficient computing power. Likewise, scaling systems to facilitate multiple virtual reality or augmented reality glasses-based users further increases computing resource demand. Cost, size, and convenience suffer when compromises required for current art solutions are applied. What is needed is an improved rendering approach, such as a direct volume rendering approach.

SUMMARY

Volume rendering offers substantial advantages for visual acuity and accuracy resulting in highly realistic imaging. Use of volume rendering in virtual reality is envisioned as allowing the virtual reality user to be immersed in an environment that is significantly closer to the physical world that other virtual reality rendering techniques for most image acquisition modalities. Some of the challenges faced when applying volume rendering to virtual reality generally center on trading off image quality and performance. This is compounded by virtual reality requiring stereo rendering (one image for presenting to the left eye and another corresponding image for presenting to the right eye). Additionally, virtual reality rendering generally requires a frame refresh rate that is high enough to ensure that users do not experience motion sickness or introducing the appearance of judder. A general tenet of virtual reality is that rendered images should have high visual fidelity. Achieving a desirable virtual reality experience may require addressing this as the user's point of view changes in the virtual reality world. However, direct volume rendering in virtual reality environments may use user motion to reconfigure settings of the renderer to deliver adaptive rendering. Adaptive rendering provides the virtual reality user with highest quality images without negative motion related effects due to slow rendering performance.

While virtual reality is an exemplary application described herein of the methods and systems of direct volume rendering and related techniques, wherever virtual reality is used, other deployment settings, such as augmented reality may apply. Therefore, unless context indicates otherwise, virtual reality and augmented reality may be interchanged in the descriptions herein.

An image analysis platform as described herein may provide a complete image based workflow exploration, definition, and execution environment for any level of scalability from a single user exploring and analyzing one single dataset to a large institute or company with a large number of users and several high content workflows producing thousands of datasets with petabytes of data per year. The platform may also be a vehicle to achieve highly scalable image analysis, by facilitating operating on a small amount of data of an extremely large database all the way up to the full database with a common set of image analysis operations. A process for image analysis may start on a workstation where data is discovered, analysis operations are tested and refined on a subset of the data, a pipeline of analysis functions are defined and configured and control is provided to execute analysis on cloud and other server-based resources that generally have greater processing and data storage resources than a workstation.

A system for rendering an image in a virtual reality environment may include a tracking device to detect a movement of a user and to generate tracking data representing the movement of the user, a capturing device to capture volume data, at least one communication interface in communication with the tracking device and the capturing device, a memory, a processor coupled to the at least one communication interface and the memory, wherein the processor: stores the volume data in a memory, sets rendering parameters for rendering the image, renders the image from the volume data based on the rendering parameters, detects a measure of a change of the movement of the user based on the tracking data; and adapts the rendering parameters depending on the measure of the change of the movement of the user.

According to an aspect of the disclosure, the processor performs the rendering of the image based on the rendering parameters by solving a rendering equation, and solves the rendering equation by Monte Carlo integration.

The movement of the user may be a movement of the user's head.

The system for rendering an image in a virtual reality environment may further include a display to display the image. The image may be a stereoscopic image, the display may be a head-mounted display (HMD), and the HMD may include the tracking device.

According to yet another aspect of the disclosure, the tracking data includes information about a position, an orientation, an acceleration, and a velocity, the measure of the change of the movement of the user is a measure of a change of at least one of the position, the orientation, the acceleration, and the velocity, and the processor: generates motion data by filtering the tracking data to remove peaks from the information about the position, the orientation, the acceleration, and the velocity, generates render statistics by measuring a rendering time required for rendering the image from the volume data, detects whether the user is in motion based on the motion data, and adapts the rendering parameters based on the motion data, the render statistics, and a result of a detection whether the user is in motion.

According to a further aspect of the disclosure, the processor increases a frame rendering rate upon detecting that the user is in motion and a resolution of the image upon detecting that the user is not in motion by adapting the rendering parameters. To generate the render statistics, the processor measures the rendering time for each of a plurality of images, filters the rendering time to remove peaks, and includes a number of rays through the volume data for each of the plurality of images in the render statistics. To increase the resolution of the image, the processor increases a ray-casting accuracy, increases a number of light samples, increases an image resolution, and superimposes the image with a plurality of images rendered before rendering a current image.

According to yet another aspect of the disclosure, the rendering parameters include a resolution of the image, a resolution of the volume data, a number of rays through the volume data, a size of a step along a ray through the volume data, and a number of light samples.

A method for rendering an image in a virtual reality environment may include capturing volume data with a capturing device, storing the volume data in a memory, detecting a movement of a user with a tracking device, generating tracking data representing the movement of the user, setting rendering parameters for rendering the image, rendering the image from the volume data based on the rendering parameters, detecting a measure of the movement of the user based on the tracking data, and adapting the rendering parameters depending on the measure of the movement of the user. The method may further include performing the rendering of the image based on the rendering parameters by solving a rendering equation, and solving the rendering equation by Monte Carlo integration. In this method, the movement of the user may be a movement of the user's head and the method may further include displaying the image on a display. The image may be a stereoscopic image, the display may be a HMD, and the HMD may include the tracking device. In this method, the tracking data may include information about a position, an orientation, an acceleration, and a velocity, and the measure of the movement of the user may be a measure of a change of at least one of the position, the orientation, the acceleration, and the velocity.

According to an aspect of the disclosure, the method for rendering an image in a virtual reality environment may further include: generating motion data by filtering the tracking data to remove peaks from the information about the position, the orientation, the acceleration, and the velocity, generating render statistics by measuring a rendering time required for rendering the image from the volume data, detecting whether the user is in motion based on the motion data, and adapting the rendering parameters based on the motion data, the render statistics and a result of the detecting whether the user is in motion.

According to another aspect of the disclosure, the method for rendering an image in a virtual reality environment may further include: increasing a frame rendering rate upon detecting that the user is in motion, and increasing a rendering quality and an image resolution upon detecting that the user is not in motion, wherein the increasing of the frame rendering rate and the increasing of the rendering quality and of the image resolution are performed by adapting the rendering parameters. The generating of the render statistics may include: measuring the rendering time for each of a plurality of images, filtering the rendering time to remove peaks, and including a number of rays through the volume data for each of the plurality of images in the render statistics. The increasing of the rendering quality and of the image resolution may include: increasing a ray-casting accuracy, increasing a number of light samples, increasing an image resolution, and superimposing the image with a plurality of images rendered before the rendering a current image.

According to yet another aspect of the disclosure, the capturing device may be one of a microscope, a magnet resonance imaging (MRI) device, a computer tomography (CT) device, and an ultrasound scanning device.

According to a further aspect of the disclosure, the rendering parameters include a resolution of the image, a resolution of the volume data, a number of rays through the volume data, a size of a step along a ray through the volume data, and a number of light samples.

Methods and systems of image analysis may include a method of scalable image analysis that may include storing an image in a computer accessible non-transient memory as a plurality of image resolution data sets, wherein the image is stored as a plurality of image resolution layers, each image resolution layer corresponding to one of the plurality of image resolution data sets and comprising a subset of image data for a region; determining a first resolution and a first image region based on user specified image analysis parameters stored in an image analysis description file; retrieving data for the first region of the image that is representative of the first resolution by retrieving image data from at least one of the plurality of image resolution layers and combining data retrieved from each of the at least one of the plurality of image resolution layers; and generating at least one structured data set representative of the combined first image region image data with at least one of an analysis module executing on a workstation, a batch module that is executing on a server and accessed by the workstation, and an analysis server module executing on a server; wherein each of the analysis module, batch module, and analysis server perform image analysis based on the image analysis description file. In this method, the analysis module may perform analysis on the first image region at the first resolution and at least one of the batch module and the analysis server perform analysis of the first image region at a second resolution that indicates combining data from at least one additional image resolution layer. Further in this method, the analysis module may perform analysis on the first image region at the first resolution and at least one of the batch module and the analysis server perform analysis on a second image region that comprises a portion of the image that includes the first image region plus at least one adjacent image region. Alternatively, in this method, processing the combined region data with the analysis server may be in response to a request for workstation independent execution of the analysis server.

An aspect of the methods and systems of image processing described herein may include a system for performing image analysis on overlapping portions of an image at a plurality of resolutions. The aspect may include a workstation comprising a user interface for facilitating configuring in a computer accessible data file a series of image analysis functions with associated analysis parameters that include at least a description of an analysis region of the image and an analysis resolution of the image; an image storage interface for retrieving an image from a computer accessible non-transient memory that is stored as a plurality of image resolution data sets, wherein the image is stored as a plurality of image resolution layers, each image resolution layer corresponding to one of the plurality of image resolution data sets and comprising a subset of the image data, wherein the image is accessed from at least one of the plurality of image resolution layers based on at least one of the configured series of image analysis functions and combined into an analysis region by combining data retrieved from each of the at least one of the plurality of image resolution layers; and an image analysis module for generating at least one structured data set representative of the combined image data by performing the series of image analysis functions based on the associated analysis parameters. The aspect may further include a server comprising an interface to the workstation through which the series of image analysis functions are communicated from the workstation to the server and structured analysis data is communicated from the server to the workstation; an image storage interface for retrieving image data from the plurality of image resolution layers based on the series of image analysis functions and associated analysis parameters and for combining the retrieved image data into a single image file; and an image analysis module for generating at least one structured data set representative of the combined image data by performing the series of image analysis functions based on the associated analysis parameters.

Another aspect of the methods and systems described herein may include a data storage and retrieval system for a computer memory that may include means for configuring the memory according to an image data-specific structure, the image data-specific structure including: a plurality of logically distinct, hierarchically arranged layers, each layer corresponding to a distinct subset of image data for a bounded region of an image that corresponds to a distinct resolution of the image, each lower hierarchical layer containing higher resolution image data than a higher hierarchical layer, wherein generating a full resolution representation of the bounded region requires combining bounded region-specific portions of each of the plurality of logically distinct layers in the image data-specific structure; and means for accessing data stored in the image data-specific structure.

Methods and systems of image rendering may include a method of image rendering, comprising volume rendering in a virtual reality environment by applying an adapted Monte Carlo integration, grid accelerator-based view ray tracing, image filtering, and user-movement detected adapted frame compensation.

Methods and systems of image rendering may include a method of achieving a predefined image to noise ratio of a virtual reality image in a multi-pass three dimensional volume rendering process, the method may include: filtering the image; rendering a subset of the image that is local to a user based on a user point of view; rendering a portion of the image based on user detected motion; and adjusting an allowed statistical variance between rendered frames based on a user point of view.

Methods and systems of image rendering may include a method of volume rendering control that may include direct volume rendering of a first scene using a first direct volume rendering technique; detecting user motion relative to the user's field of view of the rendered scene; selecting among a plurality of direct volume rendering techniques based on the detected relative user motion; and direct volume rendering of a second scene using the selected direct volume rendering technique.

Methods and systems of image rendering may include a method of volume rendering on a computer that may include detecting a measure of user movement relative to a rendered virtual reality scene; determining compliance of the measure of user movement with a model of human movement; determining computing requirements for rendering a next virtual reality scene based on the determined compliance; and allocating hardware resources of the computer to satisfy the computing requirements. In this method, rendering a next virtual reality scene may include direct volume rendering. Further in this method the measure of user movement may include a categorization of the user movement within a plurality of user movement categories. Alternatively the measure of user movement may include a trend of user movement over a plurality of sequentially rendered virtual reality scenes. In yet another alternative of this method, a measure of user movement may be a likelihood of further user movement comprising at least one of direction, speed, and rotation. In this method, determining may comprise predicting computing resources by applying the measure of detected user movement to a model of movement-based rendering computing resource requirements.

This method may further include rendering the next virtual reality scene with the configured hardware resources. Additionally, rendering the next scene may include direct volume rendering.

Methods and systems of image rendering may include a method of establishing a rendering control set that may include rendering a frame of a virtual reality scene; detecting user movement relative to the rendered scene; applying the detected user movement to a model of human motion; and establishing a next frame rendering control set based on a result of applying the detected user movement to a model of human motion. In this method, rendering may include direct volume rendering.

Methods and systems of image rendering may include a method of establishing a rendering control set that may include rendering a frame of a virtual reality scene; detecting user movement relative to the rendered scene; calculating a compliance of the detected user movement to a model of human motion; and establishing a next frame rendering control set based on a result of the calculating. In this method, rendering may include direct volume rendering.

Methods and systems of image rendering may include a method of predicting a rendering control set may include rendering a frame of a virtual reality scene; detecting user movement relative to the rendered scene; categorizing the detected user movement into one of a plurality of specific movement patterns; and predicting a next frame rendering control set based on the categorizing. In this method, rendering may comprise direct volume rendering.

Methods and systems of image rendering may include a method of predicting a rendering control set that may include rendering a frame of a virtual reality scene; detecting changes in a rendering control set over time; predicting a next frame rendering control set based on the detected changes in rendering control set and a model of human motion. In this method, detecting changes in a rendering control set may be performed over at least three sequentially prior frames. Also in this method, rendering may include direct volume rendering.

Methods and systems of image rendering may include a method of predicting a rendering control set that may include rendering a frame of a virtual reality scene; detecting user movement relative to the rendered scene; calculating a rendering effort for a plurality of sequentially rendered frame; and predicting a next frame rendering control set based on the calculated rendering effort and a model of human motion. In this method, the plurality of sequentially rendered frames may include a plurality of frames rendered immediately prior to the rendered frame of a virtual reality scene. In this method, rendering may include direct volume rendering.

Methods and systems of image rendering may include a method of predicting a rendering control set that may include rendering a frame of a virtual reality scene; detecting user movement relative to the rendered scene; predicting a change in user movement based on a model of human movement; calculating a rendering effort for a plurality of sequentially rendered frame; and predicting a next frame rendering control set based on the calculated rendering effort and the prediction of change in user movement. In this method rendering may include direct volume rendering.

Methods and systems of image rendering may include a method of predicting virtual reality scene rendering time that may include rendering a frame of a virtual reality scene; detecting user movement relative to the rendered scene; applying the detected user movement to a model of human movement; and predicting a duration of time required to render a next virtual reality scene based on the applying the detected user movement to the model of human movement. In this method, rendering may include direct volume rendering. This method may further include direct volume rendering the next virtual reality scene.

Methods and systems of image rendering may include a method of predicting user movement that may include rendering a plurality of sequential virtual reality frames; detecting user movement associated with each of the plurality of frames; calculating a measure of rendering effort for each of the plurality of frames; processing the detected user movement and calculated measure of rendering effort to produce a relationship between detected user movement and rendering effort for the plurality of sequential virtual reality frames; predicting a next user movement based on the relationship; and configuring computing resources for rendering a next virtual reality frame based on the predicted user movement. In this method, rendering may include direct volume rendering.

Methods and systems of image rendering may include a method of adjusting a number of sequential frames required to render a virtual reality scene that may include calculating a measure of change in a virtual reality scene based on detected user movement relative to the scene; calculating a measure of rendering effort to render a next virtual reality scene based on the measure of change; and dynamically adjusting a number of sequential frames over which the calculated rendering effort is integrated based on current rendering image quality parameters and a multi-scene quality versus performance directional vector. In this method, rendering may include direct volume rendering.

BRIEF DESCRIPTION OF THE DRAWINGS

The invention will now be described with reference to the drawings wherein.

DESCRIPTION OF EXEMPLARY EMBODIMENTS

Figure 1:
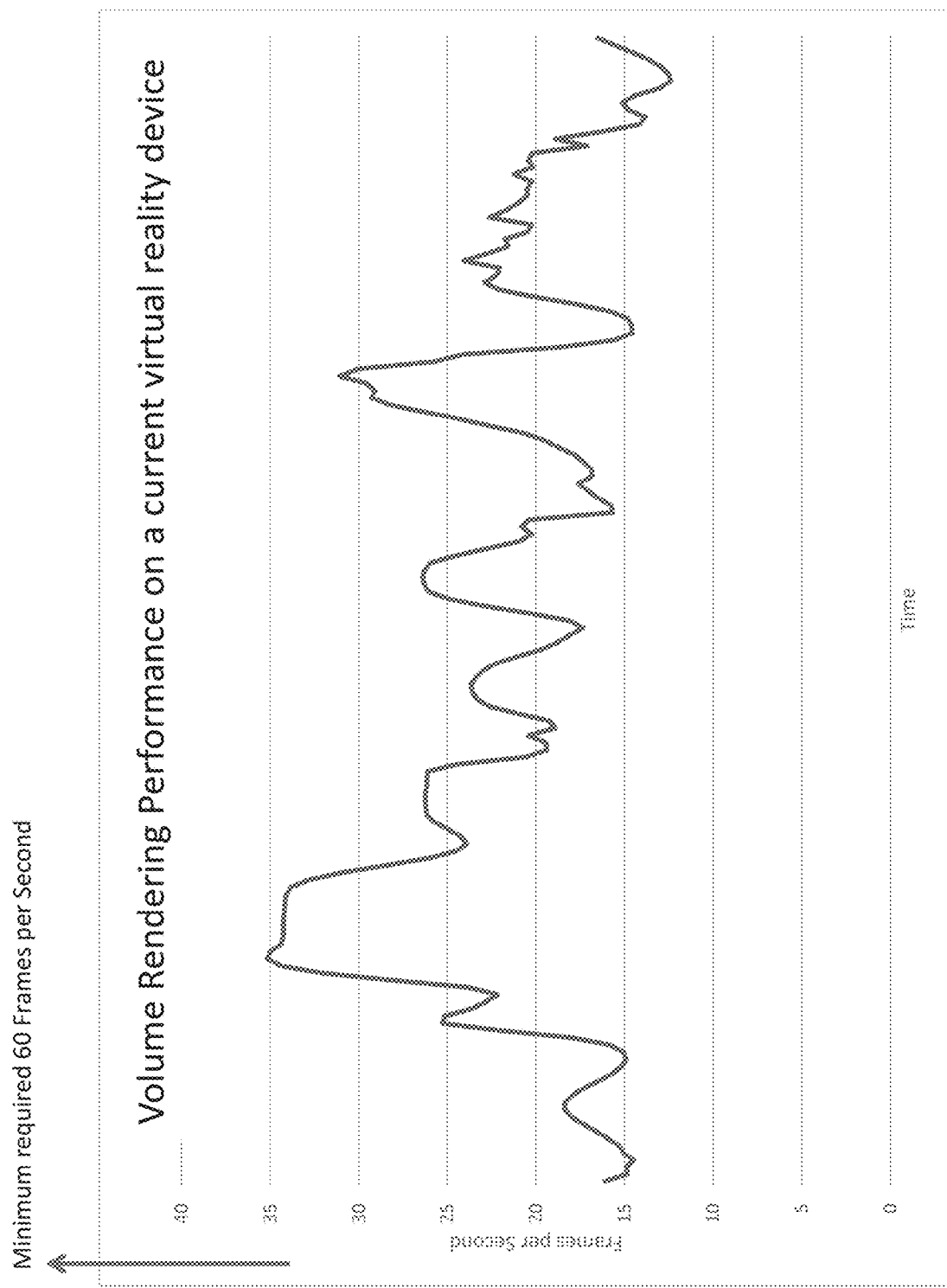
FIG. 1 shows a graph of volume rendered frames per second.

Volume rendering may facilitate visualizing three-dimensional scalar functions $R^3 \rightarrow R$). These data may be visualized by mapping intensity values [(x)] to pairs of color and opacity values, among other things. Along the view ray, one may blend the color values with the associated opacity values. From a physical point of view, three-dimensional scalar data can potentially be treated as participating media. In this case by way of example, the rendering can be expressed as computing the light transport through the media to the eye resulting in what may be called a rendering equation for participating media.

In contrast to other more basic rendering approaches, such as surface rendering, with volume rendering, the visualization of voxel based environments appears more natural and the image quality is improved. Furthermore, light introduces shadows that may be treated as an important cue for recognizing structural properties. However, solving the rendering equation is computationally expensive at least because it involves computing an integral over a large number of color and opacity values for each of the rays. Performing the many computations for volume rendering in the near real-time performance that characterizes acceptable virtual reality solutions requires computing capabilities that greatly exceeds current technology virtual reality processing hardware.

For the application of virtual reality, direct volume rendering solutions need to consider at least a few requirements. (i) Virtual reality solutions today employ stereo rendering—not only does this mean rendering two images, but the two images may need to be coordinated in both rendering and timing, resulting in computation demand that is greater than merely twice the single image rendering demand. (ii) Virtual reality frame refresh rate must be high enough to avoid user motion sickness and other motion induced effects. Generally this suggests refresh rates of at least 60 Hz and typically as high as 75 Hz or higher. Taking into consideration the movement of the user and the movement of elements in the environment, these refresh rates suggest a need for extremely high rendering rates or at least highly efficient rendering. Achieving this with volume rendering further exacerbates this challenge. (iii) Visual fidelity is important—without high image quality the use of virtual reality devices is questionable. Delivering high image quality with conventional virtual reality devices is currently a challenge for the virtual reality designer. Compounding this with volume rendering, which can readily achieve high image quality, creates additional problems of performance that need to be overcome.

The methods and systems for direct volume rendering in virtual reality may include adapted Monte Carlo integration, pre-computed acceleration techniques as "empty space" skipping or colortransferfunction (CTF) based skipping and user motion (speed, direction, acceleration, etc.) tracking to achieve a desirable degree of balance between image quality and performance.

A method of numerical integration, such as a Monte Carlo integration may be adapted so that the statistical variances that normally appear as noise can be minimized with a small number of rendering passes. One technique that may be applied is to include noise reducing image filtering that acts on the statistical variances to reduce their impact on image quality. In this way, fewer rendering passes may be required to achieve a preferred noise threshold in the image. Additionally, user point of view is measured for a range of factors including dwell, movement, direction, speed, acceleration, and the like so that the rendering can be further adapted (e.g., fewer passes, localized rendering, and the like) to achieve an acceptable level of image quality. In an example, a typical noise threshold (e.g., image fidelity threshold) may be adjusted based on the measure of user point of view. This may directly impact the rendering actions associated with any given scene or portion thereof being rendered. Additionally, the methods and systems of volume rendering described herein may include many parameters that may be adjusted to balance quality and performance. Such parameters may be preconfigured, adjusted for each rendering pass, adjusted over longer time periods, adjusted based on the information associated with a measure of the user's point of view, and the like.

An empty space acceleration structure may be configured and adjusted to further optimize rendering performance. Such a structure may be adapted for virtual reality use of volume rendering to achieve the requirements and goals associated with virtual reality rendering described above herein. As an example of an acceleration structure, a grid accelerator may be applied to the visualization space by defining a coarse grid over the volume data to be rendered. For each cell, a minimum and maximum value of a region to be rendered is computed. The values may be processed (e.g., compared to each other and/or to predefined thresholds) to identify cells that contain visible data (e.g., data to be rendered). For cells that contain no (or nearly no) visible data rendering of the cell can be skipped. This may be done by traversing a view ray as noted above and skipping the cells that have no data, effectively advancing along the ray to another cell. As yet an alternative to an empty space acceleration structure (e.g., a grid accelerator), a more sophisticated method, such as octrees may be employed.

Rendering control parameters may be made available to control rendering operations to achieve a desired mix of image quality and performance. Parameters that can be adjusted include: (i) Image resolution—the resolution of the final image can be adjusted. Fewer pixels result in fewer computations. This reduces visual details in the rendered image while improving performance. (ii) Samples per view ray for integration—reducing the samples per view ray reduces the amount of data to be processed. This reduces fine details in the rendered image while improving performance. (iii) Light transfer complexity—using an approximation of a light transfer abstract model rather than fully implementing such a model. This results in potentially lower image quality improvement from light transfer data while improving performance. Any number of illumination models can be applied to achieve benefits of light transfer analysis. (iv) Data resolution—reducing data resolution reduces the number of computations. This may result in a reduced visual resolution while increasing the performance. One example is to use a discrete Level of Detail (LoD) approach, different resolution levels of the original data are stored, such as in different data volumes. The rendering system can switch between these data volumes in-between frames.

Additionally, each frame rendering action may be adjusted based on aspects of user motion that is detected by sensors disposed for detecting and communicating movement of the user. This information generally can be suggestive of the direction, speed, and acceleration of the user relative to a field of view in the virtual reality environment. Rendering functionality, such as the volume rendering methods described herein, may be controlled through a set of parameters that facilitate trading off image quality with frame rendering performance. Examples of how user motion may impact rendering are presented for stop or near-stop motion, slow motion, and fast motion.

For detected user motion that indicates that the user's motion is effectively stopped or varying only be a small amount relative to a rendered field of view (e.g., the user may be moving his eyes to focus on certain areas of the currently rendered field of view), the parameters that affect rendering operation may be adjusted to favor high resolution rendering. This may be accomplished by increasing a number of frames to be successively rendered with each frame potentially improving some aspect of image quality. In this control set, the image rendering function may be configured (e.g., through adjusting the rendering parameters) to improve the quality of the image that was most recently rendered (e.g., rendered in the previous video frame). The detected user motion (or lack thereof) may be converted into a rendering time and/or a number of rendering frames to be allocated to rendering each scene. With the user's motion effectively stopped relative to the scene, the render time may result in multiple frames of the current being rendered sequentially, such as through volume rendering as described herein. The rendering function may interpret stopped user motion as a call for improving quality and may therefore cause each successive frame being rendered to focus on improving image quality of the prior frame or frames. Here computing resources are allocated to performing high quality rendering over time.

For detecting user motion that indicates the user is changing his field of view rapidly (e.g., turning one's head from one side to another), the rendering parameters may be adjusted to focus on maintaining rendering of scenes that are consistent with the user's changing field of view. With rapid movement the scene must also change to closely track the rate of movement of the user's field of view. To accomplish this the rendering parameters may be adjusted to focus computing resources on rendering new and/or partially overlapping field of view images quickly so that the user is unlikely to perceive the virtual reality scene as lagging behind his/her motion. With rapid user detected movement, each successive frame may include a substantial portion of data that was not present in the most recently rendered frame; therefore, as the user moves his field of view rapidly successive frames may be rendered due to lower image quality parameters being placed into control of the rendering.

For detecting user motion that indicates the user is changing his field of view modestly (e.g., between stationary and rapidly, but with a measurable movement component) rendering image quality parameters may be adjusted to strike a greater balance between rendering speed and rendering quality.

User motion is detected and applied to a model of movement to facilitate predicting what may be detected when the user motion is next checked (e.g., each frame, more often than each frame, or after a number of frames). The objective of this technique is to determine what type of rendering may best deliver the desired balance of rendering speed and rendering quality. A model of user movement, such as may be based on an understanding of how humans move, may facilitate predicting aspects of the next detected user movement. As an example, natural movement of a user's head may be modeled so that as a user moves his head slowly in a first direction, the model suggests that the user's head will continue in the same direction or stop, but likely will not immediately move rapidly in a different direction. Using the probability of a user exhibiting natural head movement can benefit trading off rendering for high quality or high performance. The examples herein reference a model of movement as a model of human movement to, for example eliminate artifacts caused by head and or body movement of a user wearing virtual or augmented reality glasses. However, because the application of virtual and/or augmented reality may not be limited to only humans, in exemplary embodiments, the model of movement is not limited to human movement. As an example, the methods and systems of direct volume rendering for virtual and augmented reality can readily apply to an animal use of virtual reality. Additionally a user may be located on an object that moves relative to the virtual reality environment, such as a vehicle, horse, boat, planet—essentially any movable object. Therefore, such a model of movement may model movement of animals, plants, vehicles, moving objects generally, planets, light, and the like. A model of movement may factor in a range of elements that may impact movement, such as gravity, wind, magnetism, inertia, and the like.

The user motion may be embodied in a directional vector, orientation change rate, some weighting factors, and the like. As an example, it may be uncommon/unnatural for a user to be exhibiting fast movement one frame and no movement the next. Therefore, weighting that the next user detected movement will be no movement all is likely to be weighted lower than the next user detected movement being a slowing down of the user's head. A user's movement may be predicted by determining a current user movement directional vector and applying a natural human movement-based weighting. This prediction may then be used to adjust rendering (e.g., by changing the rendering parameters of the rendering algorithms).

An algorithm to process, generate a movement vector, predict, and react to user movement may include a plurality of parameters, weights, and the like that may yield a time to render a next image scene. In an exemplary embodiment, such an algorithm may include linear approximation.

The detected movement data are used to compute how fast the user is moving and the principle movement direction. Both types of information should be considered. For instance, sideward movement and rotation impacts a user's potential for motion sickness more than forward movement. The same is true for fast and slow movement. Therefore both direction and acceleration of the movement contribute to calculating a goal weighting between performance and quality. This can be represented as a fuzzy value in the range [0 . . . 1]. This algorithm can be summarized as follows: (i) When the user stands still or the movement acceleration is in a certain range the weight is heavily toward providing the highest quality. (ii) When the movement gets faster performance is weighted more heavily over time and hence results in a decrease in the rendering quality settings. (iii) When the movement is fast, performance is primary, such that weighting heavily favors performance. Thresholds among these weightings may depend on user configurable settings. The relationship among these three exemplary weightings may be linear. However, different kinds of movement may typically be weighted independently. This may permit favoring certain specific movement patterns (e.g., rotation or sideward movement) when determining rendering quality/performance weighting.

Rendering based on a user movement vector, and changes thereto may be adjusted to favor quality, performance, or attempt to strike a balance. When there is no detected motion, performance may be given little consideration in the rendering operation. When rapid movement is detected, particularly accelerating movement, quality may be given little consideration in the rendering operation. By keeping track of rendering effort per frame, it may be possible to facilitate better predicting a change to a user movement vector. As an example if the rendering effort has been high for several frames, (e.g., successive frames include substantively different data) this may be suggestive of rapid or accelerating user movement. If the rendering effort has been low (e.g., much of the same data is rendered in sequential frames), this may be suggestive of little or no user movement.

Tracking effort per frame also can reduce the potential for hard switches in image quality rendering. One technique may include integrating the rendering effort (e.g., the time or number of frames associated with rendering a scene) over a plurality of sequential frames so that a significant change in rendering quality parameters will be slightly mitigated to provide a better virtual reality experience. Averaging is one potential integrating function that may be used here. The number of frames over which the rendering effort may be averaged may further be dependent on the changes to the user movement vector. Rapid acceleration may reduce the number of frames for averaging so that recently rendered frames that focused on high quality do not effectively slow down rendering performance when a user's detected motion is rapid. Likewise, if a user's detected motion indicates the user has abruptly stopped his motion, recently rendered frames that focused on low quality (e.g., during the user's rapid movement) can be removed from a rendering effort averaging function to effectively more quickly achieve high image quality. Rendering effort may be combined with user movement speed and user movement acceleration to produce a rendering quality setting for a next frame to render.

Another technique of ensuring rapid quality changes are not presented to the user includes dynamic frame compensation, which entails adjusting the number of frames for accumulation with regard to the quality weight and the current quality settings. In one exemplary implementation there may be a simple linear relationship between the number of frames and the quality weight. In another exemplary implementation, a highest quality mode may use a user-defined number of frames for decreasing the number with regard to the current quality weight. In yet another exemplary implementation dynamic frame compensation may be disabled when high performance is requested.

Rendering settings may include a list of predefined settings. The settings may be chosen to facilitate smooth quality switches. One approach may be to switch quality settings sequentially to provide smooth transitions. In one exemplary implementation the image resolution and the number of ray samples may be adjusted. A settings list based on this sequential adjustment may be automatically generated as follows: (i) reduce the number of ray samples to a certain degree successively; (ii) reduce the number of pixels by a certain degree (once); (iii) start with (i) and repeat. In an exemplary embodiment, an initial setting may be the highest quality setting (e.g., the image resolution of the virtual reality device display) along with user defined ray sample quantity. An initial ray sample quantity of less than or equal to 1 (one) per voxel would potentially provide the best possible quality.

It may be advantageous to permit the reduction factors for ray samples, image resolution and the number of iterations to be user defined. Additionally it may be advantageous to have different predefined settings for different kinds of computer and VR devices.

The methods and systems associated with volume rendering in virtual reality may facilitate use of volume rendering in a range of virtual reality devices. Examples of certain types go by various trade names including OCULUS RIFT, SONY PROJECT MORPHEUS, HTC VIVE, VALVE STEAM, HOLOLENS and others. However, the user experience for voxel based image data in any other type of virtual or augmented reality device may be enhanced through the use of direct volume rendering. By applying at least a portion of the methods and systems described herein for rendering images using volume rendering, these and other virtual reality devices may gain the benefits of volume rendered images.

Referring to FIG. 1, frame rate performance for volume rendering using a state of the art virtual reality device is graphed. This data represents frames per second rendered during a flight through a neuron data asset that has been sub-sampled to roughly 4 GB of voxel data ($1300^3$ voxels) with high quality render settings. Achieving at least 60 Hz rendering frame rate cannot be achieved with a conventional volume rendering approach using current technology virtual reality hardware. To achieve a minimum of 60 Hz sustained frame rendering rate in this scenario would require graphics processing that renders graphics at least 5 times faster than recent high end graphics processing units (GPUs). Therefore, applying the methods and systems of volume rendering described herein in virtual reality results in a significant improvement in virtual reality hardware performance while maintaining desirable virtual reality environment operation.

Figure 2:
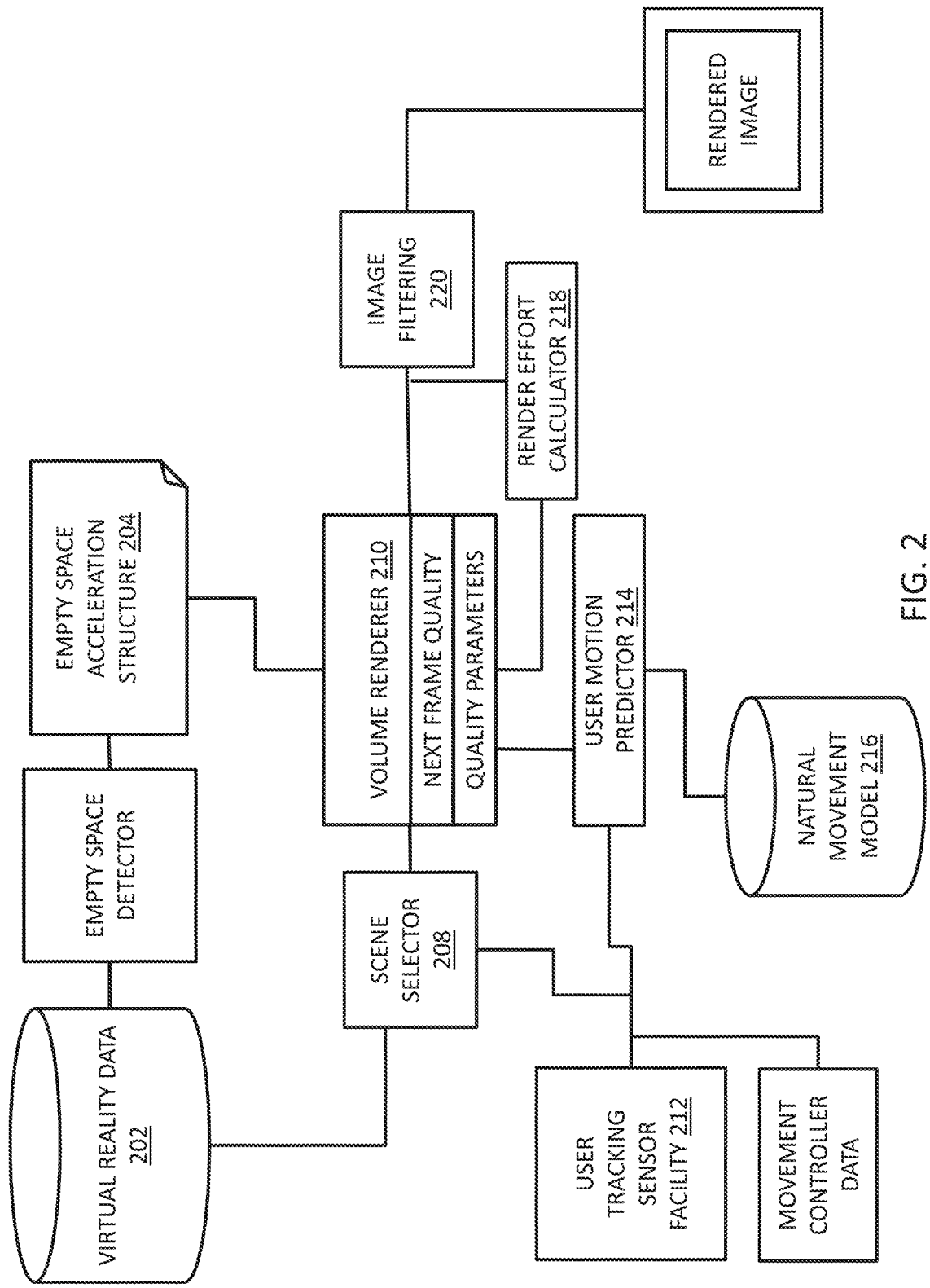
FIG. 2 shows a block diagram of an exemplary embodiment of the methods and systems described herein.

Referring to FIG. 2, a block diagram of the methods and systems of volume rendering in virtual reality is depicted. Virtual reality data 202 may be processed to generate pre-computed empty space accelerator structure 204. This structure 204 along with scene data selected by a scene selector 208 from the virtual reality data 202 may be processed by a volume rendering facility 210. Scene selected data 208 may be selected based on user point of view data that may be collected with a user tracking facility 212 and/or a movement controller data facility. A movement prediction facility 214 may receive user movement data and reference a natural movement model 216 to generate a range of user movement data including a user movement vector, user movement direction, speed, acceleration, and the like. The movement prediction facility 214 may provide input to the volume rendering facility 210. Rendering effort for each frame may be measured by a frame effort calculation facility 218. This facility 218 may process a series of frame rendering effort measurements to provide an integration of multiple frames rendering effort to the volume rendering facility 210. The user movement data and the integrated frame rendering effort data may be combined (e.g., in the volume rendering facility 210) to produce a next frame quality control set of parameters. These parameters may at least partially determine the quality of the next frame to be volume rendered. Additionally, image-filtering facility 220 may process a volume rendered image to reduce noise or other artifacts that may compromise image quality.

Figure 3:
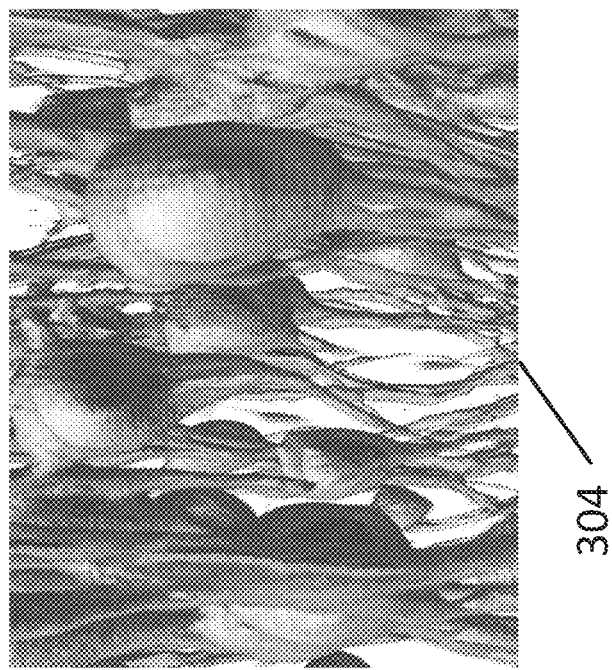
FIG. 3 shows surface and volume rendered images.
Figure 3:
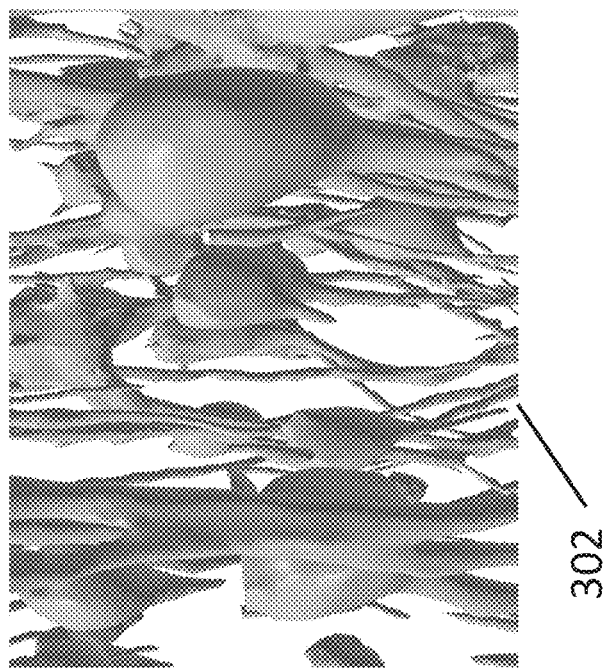

Referring to FIG. 3 that depicts surface and volume rendering in virtual reality, element 302 depicts a surface rendering of a three-dimensional neuron data set. This surface rendering of automatically segmented neurons is from a base volume data that was recorded by a ZEISS Lightsheet.Z1 and was optically cleared using LUMOS. Element 304 depicts the same base volume data set as element 302 directly volume rendered. Different aspects of the data are highlighted with color or shading schemes. Semitransparent surfaces enable a "look inside" the neurons in contrast to the opacity of the neurons in 302.

Improvements in direct volume rendering may be achieved through adapting Monte Carlo integration as described herein. Initially, consider visualizing volume data based on Monte Carlo integration. Visualizing volume data can be expressed as an integral over the image pixels. The value of a pixel represents the light energy transmitted through the volume into the eye. During the transmission the light is (a) absorbed and (b) scattered. The Monte Carlo Rendering solves this integral by casting a view ray through the volume (ray marching). The ray is divided into equidistant steps, leading to a sequence of sample points. For each sample point the incident light is estimated and it is computed how much of this light is transported along the ray into this eye. Multiple images are combined to reduce the noise that occurs due to stochastic variations. The supported lighting effects only depend on the complexity of the implemented lighting model. However, this method does not speed up the visualization process. Moreover, to support shadows, the shadow needs to be estimated at each sample point. Real-time or interactive performance may be hard to achieve.

An alternative Monte Carlo algorithm especially for volume rendering can be based on Woodcock Tracking. Woodcock tracking propagates through the volume with random step length and determinates a single scattering point. Details in the volume are reconstructed over the time by combining multiple passes to achieve the same visual quality as the common Monte Carlo Rendering. However, computation for the complex lighting is reduced to a single point.

Integration over time (accumulating the result of multiple render passes) can be done in an interactive way. The immediate result can be displayed to the user. This enables high performance volume visualization with a complex lighting model and global illumination effects suitable for real-time virtual reality visualization.

The methods and systems of direct volume rendering described herein may include a complex ray-casting framework containing classic and Woodcock tracking algorithms that support: (i) different lighting models (local, phase, shadows, maximum intensity and the like); (ii) complex camera properties (lens, projection and the like); (iii) live preview of the time-based integration; and (iv) quality control based on tracking user motion.

A basic problem in virtual reality (VR) using glasses is only one person can get the VR experience. It is hard to scale the number of concurrent users for a glasses application as is possible in spatial VR environments, such as VR Caves. But there are several VR applications, such as education, training, guided tours through an environment that are based on the idea of concurrent users in the same virtual landscape.

The methods and systems of direct volume rendering for virtual reality may further include systems configured for collaborative virtual reality. Such systems may include workstations connected by high speed network over which data is transferred to facilitate an adapted synchronizing protocol. Other aspects of the system include virtual reality glasses that communicate with the workstations.

The methods and systems described herein enable concurrent users via an adapted scene sharing protocol. The system includes a number of workstations and glasses. The workstations are connected via a fast network that is controlled by a network protocol synchronizing several parameters between all users. Elements of this network synchronizing protocol include the current dataset, virtualization parameters, position and view frustum for each person in a virtual space, current presentation mode, role and visibility of users, among other things. Optionally, parameters and/or data may be synchronized over the network. It may not be necessary to synchronize both all the time.

Two exemplary modes of synchronization include a free mode and a virtual classroom mode. Free mode involves each user moving independently and controlling the visibility of his/her avatar. Avatars (visible or not) provide a position of the user as well as his/her view vector.

Users can decide to "follow" another user (e.g., a leader). In a follow-the-leader scenario, the leader controls the following users position but they can look around freely. The avatars of the following users are invisible. As a following user can see the leaders view vector it can also follow his view. Alternatively the view reference point is estimated from the leaders view and presented as a special hint in the followers view.

Virtual classroom mode may include one presenter and a plurality of spectators. In this scenario a presenter may have full control of the environment and a degree of freedom for spectators may depend on the presentation mode. Specifically, if the presentation mode is a free mode, the spectators can move freely about the environment (this is similar to the free mode described above). If the presentation mode is a follow-mode, the spectators are restricted to following the path of the presenter through the environment, but can freely look around.

In the virtual classroom mode, a presenter can mark interesting details, record paths through environment and changes of the environment, provide indications of interesting things to spectators, provide a guided tour. Additionally the presenter role can be transferred to spectators via, for example a presenter token exchange.

The methods and systems of direct volume rendering facilitate collaborative virtual reality on large datasets without requiring synchronization of the full data set itself among the workstations. Portions of the data set can be installed on every workstation or can be accessed via a fast central storage so every workstation can access the same dataset on the storage while maintaining an acceptable level of virtual reality direct volume rendering.

Orientation in scientific visualization, such as within human anatomy needs to be addressed via techniques that are not necessary in natural environments, such as flying, swimming, and the like. Techniques for establishing user location may include relying on cut away views, bird views, overviews including pie cut, transparent volume with marker, cut away views and the like, and visualization of the view-frustum. Techniques for establishing user viewing history may include breadcrumb navigation, manually setting way points, animated path recording that supports moving back and forth along this path, and the like. Techniques for determining a way through a volume may include manually setting points of interest in advance of entering the volume, semi-automated point of interest setting, an automatic point of interest setting based on manually set points and machine learning. Animations may be used to maintain the users mental map.

The methods and systems of direct volume rendering for virtual reality may be applied in a range of environments and markets including geo informatics, such as weather, insurance assessment, general research, and the like; exploration for oil and gas reserves; material science, automotive products, semiconductors for activities such as research, quality control, biomedical imaging, material identification, and the like; astrophysics for activity such as space exploration, aggregating tiling and mapping, multi-modal datasets, deep space tracking, and the like; healthcare; education; training; patient care for activities such as surgical microscopy, diagnostic imaging, correlative microscopy, disease monitoring, neuron segmentation, precision medicine, ribonucleic acid (RNA) sequencing, and the like; telemedicine for tasks such as clinical trials, image data management, remote image analysis, and the like; life sciences for items such as direct patient care, pharma, biotech, and agritech research, cell biology, personalized medicine, and the like.

Figure 5:
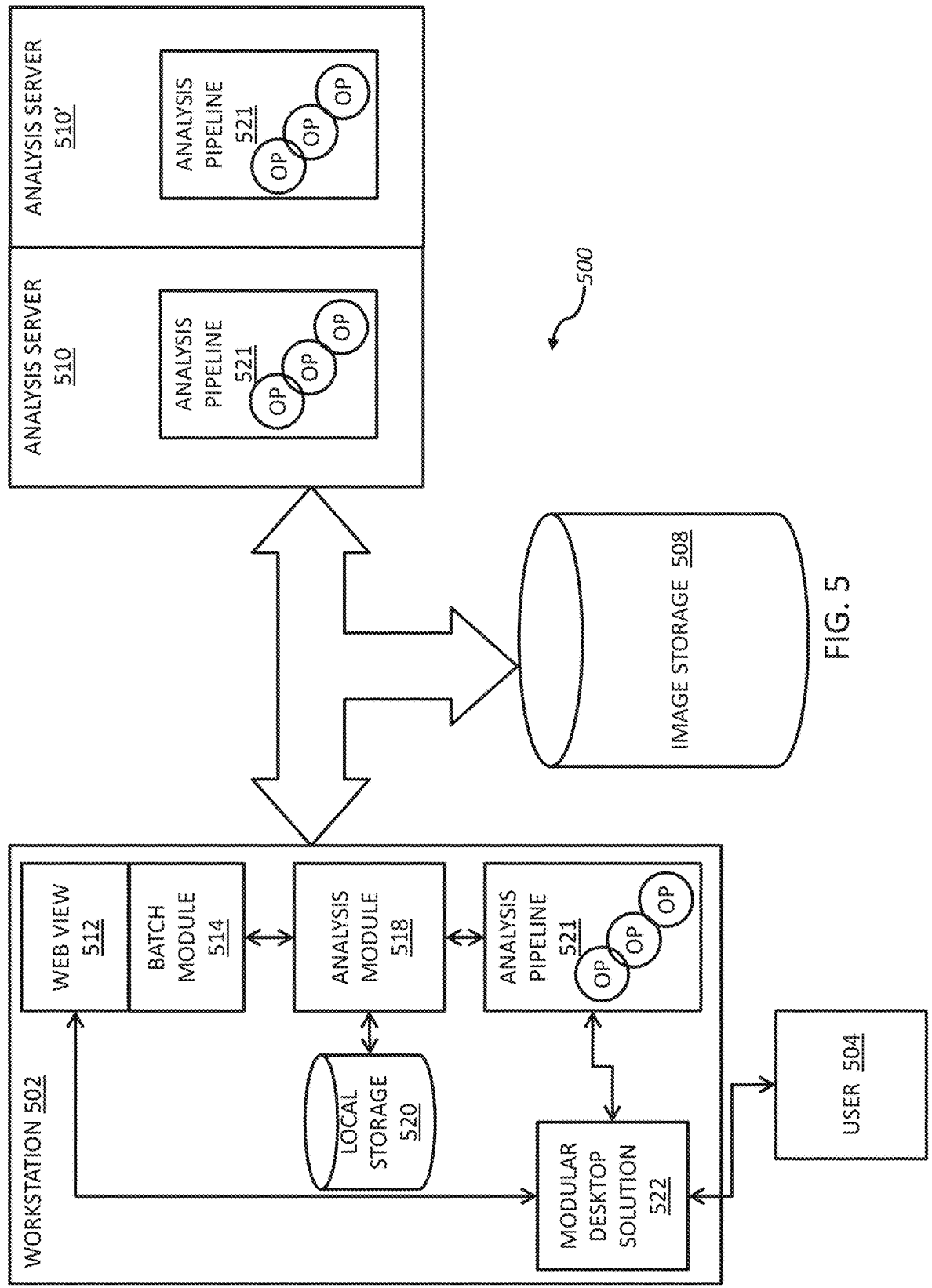
FIG. 5 shows a scalable image analysis pipeline platform.

As shown in FIG. 5, an image analysis platform may provide flexible image handling, management, visualization, analysis and distribution of results. The image analysis platform 500 may consist of several modules dealing with image data and with at least two computing means—a workstation 502 and a server. (i) A modular desktop solution 522 for importing, exploring and visualizing image data from different sources; a pipeline configuration module 518 for use with the modular desktop solution (also called an analysis module) for interactively creating image analysis workflows, such as pipelines of image analysis operations 521; (iii) an automated pipeline execution module 514 (also called a batch module) suitable for use by a user 504 via the desktop solution 522 for processing a number of datasets or regions of interest in one or more configured pipelines automatically; (iv) a headless, standalone service process (also called an analysis server) 510 for processing a configured analysis pipeline 521 on a dataset on a server that can be controlled remotely via a HTTP/REST interface or the like; and (v) a modular, web based framework (also called web view) 512 to manage image data and containing a module to control the analysis server. Data storage features may include local workstation storage 520 and network accessible image storage 508.

The image analysis platform combines these modules to be able to provide a complete image based workflow exploration, definition, and execution environment for any level of scalability from a single user exploring and analyzing one single dataset to a large institute or company with a large number of users and several high content workflows producing thousands of datasets with petabytes of data per year or less.

The platform may also be a vehicle to achieve highly scalable image analysis, by facilitating operating on a small amount of data of an extremely large database all the way up to the full database with a common set of image analysis operations. A process for image analysis may start on a workstation where data is discovered, analysis operations are tested and refined on a subset of the data, a pipeline of analysis functions are defined and configured and control is provided to execute analysis on cloud and other server-based resources that generally have greater processing and data storage resources than a workstation.

A user may start with one small portion of a data set to do the parameterization and test the analysis, such as on a user's workstation. The pipeline of analysis operations being configured and performed on a data set on the workstation can be performed by a server on one or multiple data sets. Multiple data sets may include various portions of a large data set or different data sets. The platform facilitates access to scalable client-server cloud-based resources to perform a tested pipeline of analysis operations on multiple data sets using multiple processors. This may produce many results that can be accessed, aggregated, further analyzed (e.g., statistically and the like) via the web view interface that uses the workstation as a client to access a server to perform the statistical analysis.

In an example of an image analysis pipeline, such a pipeline may be a flow of analysis components (e.g., operations) that perform different analysis roles including:
  a. Image Filters—image modification for emphasizing special features, removing artifacts, or preparing data for subsequent steps,
  b. Segmenters—creating structured objects out of the image data, c. Segment Operations—filtering objects by their features as the objects volume or its neighborhood to other objects, creating joint objects as tracks or filaments,
d. Joint Objects Operations—filtering joint objects by features, and
e. Export Operations—writing results to files or databases.

A pipeline can be stored as an Extensible Markup Language (XML) fragment containing all information necessary to store operations together with all their parameters and settings. Thus, pipelines can be transported between the different scale implementations of the platform, such as by writing the XML to a file by one component and reading it by another or by transferring it via defined interfaces, such as HTTP/REST.

All pipeline-operating platform modules, including Analysis Module, Batch Module, Analysis Server may use the same backend code for processing the pipeline description. This assures that an analysis result will always be the same, independent of the module that processes the pipeline operations.

A pipeline can be either created by a specialized process writing the XML description (automated workflow creation) or by a user using the Pipeline Module. The Pipeline Module User Interface depicted in FIG. 4 contains a directory for available operations and a pipeline creation area. A pipeline is created simply by selecting operations from the directory, dragging them to the creation area and dropping them in the right order.

Figure 4:
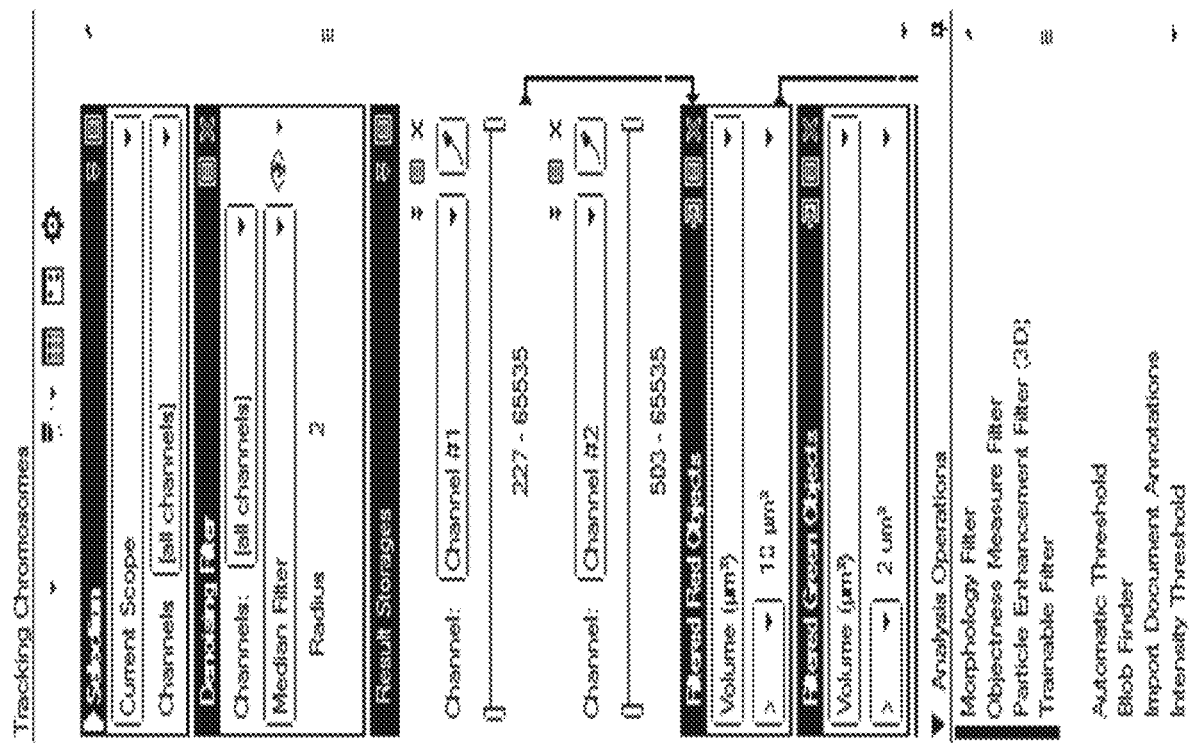
FIG. 4 shows an image analysis pipeline configuration user interface.

As shown in FIG. 4, operations can determine the data they retrieve. So, the Object Filter operation "Filtered Red Objects" in the sample pipeline gets its data from the Segmentation operation "Red Objects". While the User Interface may be restricted to creating a single data flow (e.g., operations are processed strictly top-down) the analysis itself is pretty flexible due to the source-destination data flow. The operations in a pipeline can be easily and interactively parameterized. This means, modifying a parameter can affect the data immediately. A wizard-like interface may be provided, such as to be a front-end for the analysis pipeline user interface so that as a user types in responses to certain questions, the wizard automatically generates a pipeline of analysis operations as an XML file.

A goal of an image analysis process is to create structured data from image data. In general, this can be achieved by segmentation. Segmentation defines portions of the image and applies special semantics to these regions. The Analysis Pipeline refers to these regions as objects. An object, created by for example a segmentation (Segment), tracking (Track) or tracing operation (Filament), has a number of features assigned. For instance, a Segment has a volume, an area and a mean intensity. A Track includes a collection of Segments in the time domain and therefore has a length or a speed.

By creating objects and assigning feature values, a raw image dataset develops structure. Objects can be compared by size, neighborhoods can be defined, the object data can be easily stored in databases and statistical methods can be applied on them. Thus, most analysis workflows create a (large) number of objects. The platform contains tools to evaluate, compare, group and analyze them.

Below are several scenarios for scalable analysis pipeline applications.

Creating a Pipeline on a Region of Interest Locally

A basic Pipeline could be created interactively using the modular desktop solution and the Analysis Module. To create an Analysis Pipeline may involve an iterative process and the Analysis Module provides tools to support this process. The first step of a pipeline may include selecting a Region of Interest (RoI) for the interactive process. The user can try different RoIs and analysis operations to find a suitable combination of operations and parameters. He can go through the pipeline step by step in both directions. The interface of the analysis module may support comparing the output of two operations simply by clicking on them. Image Filter operations contain a preview mode for immediate feedback on parameter modification. The user could even integrate his own algorithms using Matlab, Python operations, or the like. In the end the user can store the pipeline as an XML file so the result of this step is a definition of the analysis process.

Running a Pipeline on a Dataset

After creating a pipeline, the user can run it on a whole dataset on his workstation. To run a pipeline, it has to be loaded and the user has to click the "Run" button. Now the complete workflow is performed, results are stored in the dataset file. All operations support parallelization on central processing unit (CPU)level so the workstations capabilities are used as good as possible. The result of this step is a number of results for one dataset on one workstation.

Running a Pipeline on a Number of Datasets

In most applications it will be necessary to apply the same analysis on a number of datasets. One method to do this is to use the Batch Module. Here, the user can select a pipeline and a number of datasets or RoIs in datasets. He can set several parameters as result storages etc. The analysis of all datasets runs successively, each dataset analysis is parallelized as in running a pipeline on a dataset described above. This steps result is a number of analyzed datasets on a single workstation.

Running Several Pipelines on a Number of Datasets

For user groups it is crucial to analyze several datasets at the same time using powerful server environments. For this application the Analysis Server module is intended. A number of Analysis Server instances can be started on a server system in parallel. These running instances are waiting for calling processes to contact them and pass parameters necessary to run a pipeline on a dataset. External systems can pass pipeline descriptions and dataset references via a simple HTTP/REST interface. Each Analysis Server process contains a built-in scheduling so even a large number of analysis requests are processed in a meaningful order. Analysis results are stored in files corresponding to the datasets.

Integrated Management and Analysis Environment

Especially large user groups need an image storage and management system to store image datasets in a structured way. This includes a role based rights management, support for distributed storage and data distribution and sharing. The web view module is a modular toolkit to facilitate creating structured image management. Users can upload and register datasets into the system, data can be managed, visualized and annotated via any web browser.

One basic web view feature is image analysis. Web view can manage and control a number of Analysis Server instances. Beside image data the system manages analysis pipelines and users can apply a number of pipelines on a number of datasets via a simple web interface. Web view will substitute the original storage operations in order to store all structured data into one database. Thus, a user can visualize the objects directly in the web browser as well as get statistics and result data.

Publishing Datasets and Remote SIS

The module desktop solution and associated web view module may not be isolated modules but may form a powerful joint infrastructure. So, any dataset used locally on a workstation and stored on a central storage that is accessible to the workstation can be registered in the web view module. There may be a "register dataset" function in the web view module and a "publish to web view" function in module desktop solution to do so.

Any dataset accessible by the web view module can be used by a local modular desktop solution instance. In order to do this the web view module dataset description contains a link. This link can create a locally installed modular desktop solution instance and opens the dataset via a remote protocol (e.g., remote SIS). Of course, all user permissions can be respected.

The remote SIS protocol mentioned above is a mixture of a web view module data access protocol together with a caching algorithm that takes advantage of an image pyramid data structure storage approach. If a portion of the dataset is requested by the locally operating modular desktop solution instance, the request is translated into appropriate web view module data requests. This may result in receiving tiles of the image data requested. These tiles are transferred to the modular desktop instance as well as cached in a local SIS caching file that is controlled by a caching controller. The caching controller knows which parts and voxels of the dataset at which zoom level are already cached. Therefore, for the next request the caching controller will read the cached data from the local SIS caching file and transfer only the missing parts of this requests. Over the time, larger and larger portions of the dataset are cached.

The platform provides flexibility to the user to choose the mode of operation that best fits his needs: for interactively working with the data he may use the modular desktop solution instance, either on local files or via remote SIS with caching. For analyzing large amounts of images he can easily use the web view module to process the data on a remote server system.

The caching approach supports pyramid image data structuring that stores data for different resolutions of the image on different layers. In an example, a 4×4 square of pixels may be stored so that 3 of 4 pixels are stored in a first layer and the 4th pixel is stored in a second layer of the data set. Reading a data set may start at the smallest zoom level and continue accessing additional resolution layers until all of the pixels needed to satisfy a particular resolution requirement are retrieved. In an example, if the request is to display a 100×100 image that represents a 10000×10000 image (or a 10% resolution), the image core works with the cache controller to determine if the requestedresolution-specific pixels are available. Given the low-resolution requirement most if not all of the required pixels may be cached locally. The controller may request via remote SIS any missing pixels.

However, to show a 100×100 full resolution of a small fraction of the full data set, unless the 100×100 object has been retrieved at full resolution already, the cache controller can request the data by sending a remote SIS request for the data to the server who transfers and it is stored locally.

Working with Analysis Results in Remote and Desktop Environment

After an analysis was processed with by a server, the results can be reviewed using web view module tools. As an example, datasets can be visualized together with the result objects as an overlay. In another example, objects can be listed in a table view with feature values, and statistics can be visualized in tables or diagrams.

The results could also be imported into the locally instantiated modular desktop solution. A web view service can export analysis results and related objects to the local workstation where the modular desktop solution can import them for the appropriate dataset. Alternatively, results and datasets can be loaded via a remote connection, such as via remote SIS from the analysis server.

After getting dataset and analysis results the user is able to perform quality review and control steps or use the existing analysis results as a basis for advanced analysis steps.

To maintain ease of use, the platform may restrict a user to configuring and defining a unitary pipeline to avoid the complication of needing to configure a pipeline that supports splitting and reconnecting the data flow. The platform may facilitate storing the data and parameters for each operation separately to allow read access to each operation via a single click in a user interface that displays the analysis pipeline as a set of operations. By clicking on any operation the user may see the output of the selected operation. This allows the user to effectively look forward and backward through the pipeline of operations while always displaying a valid result. In embodiments this modular operation is a result of both image and object (image subset) control of an analysis operation. For image control, an image-processing core can handle different versions of a data set within a single data set instance. Therefore storing the original source data and the modified images in a single data set is supported by the platform. For object control, image subsets, herein referred to as objects that are regions of interest are defined by a segmentation process. These objects may be defined in a database and can be tagged during the pipeline operation(s) we keep all of these objects. Pipeline operations, such as a filtering operation uses these tags to determine which objects to access. To effectively move backward to an earlier analysis operation step, the tags indicating the objects that have been processed by the intervening steps can be removed. In an example, the tags may refer to different versions of the image data stored in the data set.

Image analysis workflows or analysis pipelines that process big image datasets may need a long time (e.g., several hours per dataset) to process. There are several situations in a workstation environment as well as in a server environment where it could be desirable to interrupt a workflow and continue it on the same position or a different earlier position at a later time. In an example of interrupting an analysis workflow a workstation a pipeline may be interrupted if the device is needed for other purposes or the analysis process could be rescheduled to times of less usage (e.g. during the night). In a server scenario a task scheduler on the server should be able to decide to interrupt a pipeline, such as due to quantitative parameters as better parallelization or higher priority of other analysis runs.

Additionally, interrupting an analysis pipeline may happen in two different scenarios: (i) between two operations and (ii) inside an operation. For scenario (i) as the analysis pipeline consists of a number of independent operations, on an interrupt command the Analysis Pipeline module stores temporary image data as well as current object data in separate storages (e.g. intermediate storage). Interrupted pipelines may be stored in a global list. If an interrupted pipeline is continued, the intermediate storages can be accessed again and the process continues with the next operation. For scenario (ii) use of a multi-threaded environment facilitates intra-operation interruption because individual threads are interruption aware. Thus, each operation can be interrupted. Dependent on the operation being interrupted either the state after the previous operation is restored or the operation may store an interim state. The latter technique may be implemented for operations that require processing resources, such as computing cycles and memory that exceed a resource consumption threshold. Therefore, operations that are expensive in terms of processing resources may be resumed through standard thread start/restart techniques In a server environment, or at least an environment with a scheduler, the scheduler may monitor a number of parameters for each analysis pipeline scheduled and the global environment. Each pipeline may be given a priority and resource load/cost values for computation and data transport. Therefore, the scheduler is able to optimize parallelization for several pipelines. Furthermore, the scheduler can control the interrupting and postponing of a pipeline. If the intermediate storage is growing e.g., due to interruptions, the scheduler can increase the rank of interrupted pipelines to achieve the best tradeoff of the different parameters.

The scalable image analysis platform may include features that enable efficient operation by defining and selecting two-dimensional, three-dimensional, or higher dimensional data. One such feature comprises data storage and access features that can be built into the workflow analysis operations directly. For three-dimensional analysis operations, the analysis requirements, such as the size of the region to be analyzed can be used to determine an optimal three-dimensional brick size to access from image storage to reduce the number of access requests required to populate the region to be analyzed.

Figure 6:
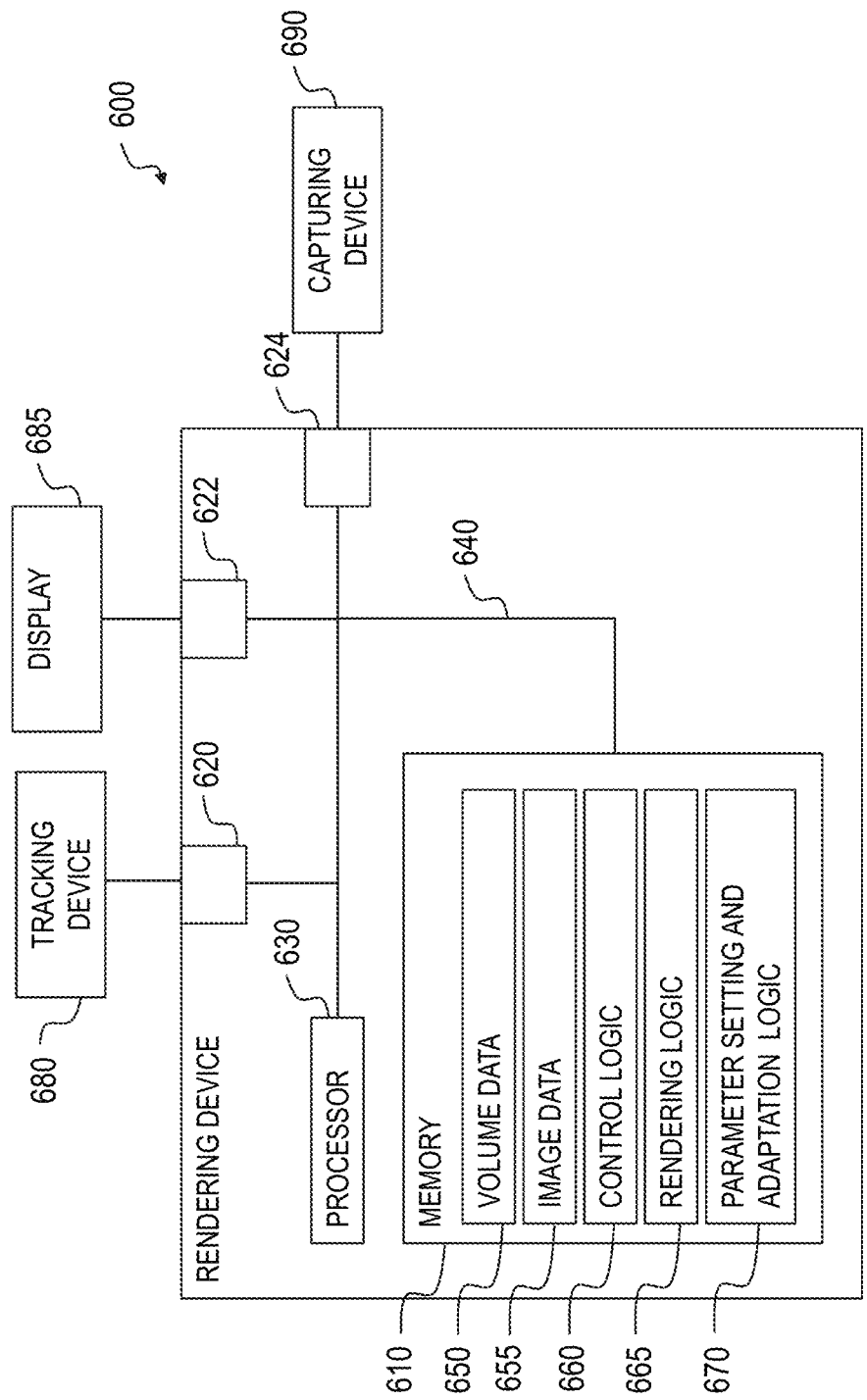
FIG. 6 shows a block diagram of a rendering device for rendering an image in a virtual reality environment according to an exemplary embodiment of the disclosure.

FIG. 6 shows a block diagram of a rendering device 600 for rendering an image in a virtual reality environment according to an exemplary embodiment of the disclosure. Rendering device 600 includes memory 610, communication interfaces 620, 622, and 624, processor 630 in communication with memory 610, and communication interfaces 620, 622, and 624 via computer bus 640. Memory 610 stores volume data 650, image data 655, control logic 660, rendering logic 665, and parameter setting and adaptation logic 670. In the exemplary embodiment shown in FIG. 6, tracking device 680 is connected to rendering device 600 via communication interface 620, display 685 is connected to rendering device 600 via communication interface 622, and capturing device 690 is connected to rendering device 600 via communication interface 624. Processor 630 is, for example, a microprocessor or microcontroller that executes instructions for control logic 660, for rendering logic 665, and for parameter setting and adaptation logic 670. Processor 630 can be any type of processing unit including, but not limited to, a GPU on a video card or embedded on a motherboard, or a general CPU. Control logic 660 is software that enables rendering device 600 to connect to tracking device 680, display 685, and capturing device 690 via communication interfaces 620, 622, and 624 and to store volume data 650 captured by capturing device 690. Rendering logic 665 is software that enables rendering device 600 to render images from volume data 650 based on rendering parameters by solving a rendering equation, to store image data 655 in memory 610, and to display the image on display 685. For example, rendering logic 665 may include software implementing Monte Carlo renderer 760 shown in FIG. 7.

Parameter setting and adaptation logic 670 is software that enables rendering device 600 to set and adapt rendering parameters depending on a measure of a movement of a user. The parameter setting and adaptation logic 670 may include software implementing filter 720, motion detector 730, quality advisor 740, image improver 750, and FPS-counter 770. However, any or all of the filter 720, motion detector 730, quality advisor 740, image improver 750, and FPS-counter may also be implemented as field-programmable gate arrays (FPGA) or application-specific integrated circuits (ASIC).

Communication interfaces 620, 622, and 624 may be, but are not limited to, any type of communication interfaces including network infrastructure interfaces, such as wireless local area networking (WLAN) interfaces, personal area network (PAN) interfaces, wired networking interfaces, and Universal Serial Bus (USB) interfaces, etc.

Display 685 may be any type of display device, such as, but not limited to, liquid crystal display (LCD), light-emitting diode (LED) display, etc. In particular, display 685 may be a display of a HMD configured to display a stereoscopic image.

Figure 7:
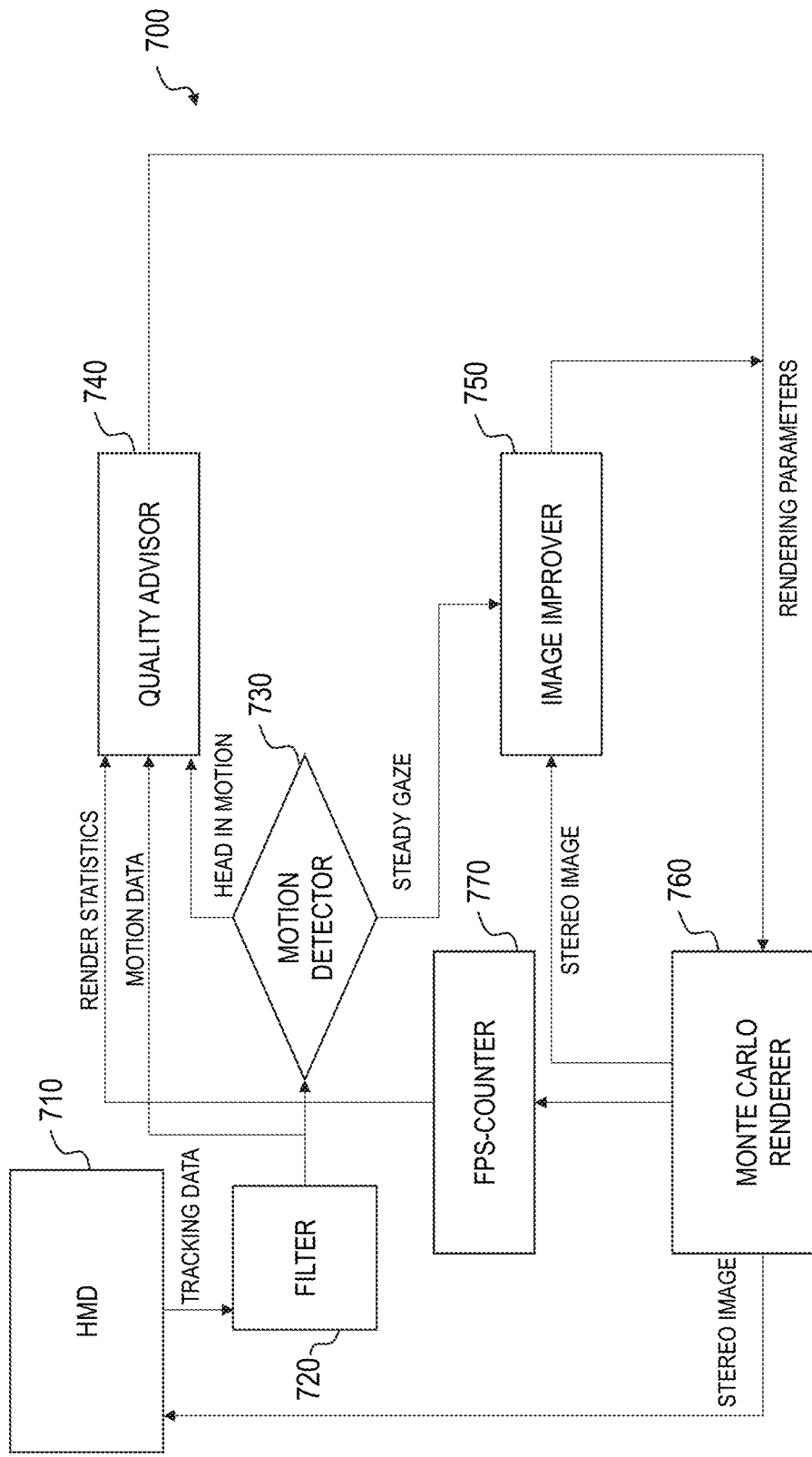
FIG. 7 shows a block diagram of a system for rendering an image in a virtual reality environment according to an exemplary embodiment of the disclosure.

Tracking device 680 may include optical or magnetic sensors and may be separate from the display 685 or combined with the display 685, for example in a HMD, e.g., HMD 710 shown in FIG. 7.

Capturing device 690 captures volume data 650 and can be any kind of a 3D scanning device, such as, but not limited to, microscopes, magnetic resonance imaging (MRI) scanners, computer tomography (CT) scanners, and Ultrasound scanners. Any kind of 3D image data can be captured and processed. This includes 3D image data captured by confocal laser scanning microscopes (CLSM), light sheet fluorescence microscopes (LSFM), and 3D X-ray microscopes (XRM), image data from a stack of registered 2D images. More precisely, if the data can be sampled on a regular 3-dimensional grid of pixels, it can be captured and stored in memory 610. This also includes simulation data, 3D function plots or output data of other 3D scanning devices.

FIG. 7 shows a block diagram of a system 700 for rendering an image in a virtual reality environment. The system includes HMD 710, filter 720, motion detector 730, quality advisor 740, image improver 750, Monte Carlo renderer 760, and FPS-Counter 770. HMD 710 has a display configured to display a stereoscopic image (not shown) and a tracking device (not shown) to detect a movement of a user's and to generate tracking data representing the movement of the user.

The tracking device 680 uses a combination of different sensor signals to detect the position and orientation of the HMD 710 within the Euclidean space. The position of the HMD 710 may be determined with an optical or magnetic tracking system. Optical tracking systems are based on a camera or cameras of infrared or structured light combined with computer vision techniques. The cameras detect markers which can be periodically flashing infrared light emitters, special visible markers like quick response (QR) codes or optical features of the surrounding. Optical tracking is either realized as inside-out tracking, where the cameras are based on the HMD 710 and the markers are placed stationary in the tracked area or as outside-in tracking, where several cameras are placed in stationary locations around the tracked space. Here the HMD 710 itself contains one or more tracking markers (i.e., flashing infrared light emitters). Magnetic tracking systems include a stationary placed base station (transmitter) which generates an electromagnetic field, and an electromagnet integrated into the HMD 710 as the tracking target. The electromagnet generates in a fast sequence three perpendicular magnetic fields, one for every spatial dimension. The base station in turn measures the changes of its own magnetic field induced by the tracking target.

The orientation of the HMD 710 in space is determined with the help of integrated inertial measurement units (IMU). The IMUs utilize accelerometers and gyroscopes to measure the linear acceleration and angular velocity of the HMD with high update rates. The measurements can be integrated to find the linear and angular position change relative to an initial point. Finally, the tracking device 680 improves the precision and speed of the detection of angular and translational changes of the HMD with the help of sensor fusion. Sensor fusion combines data from the different tracking parts (inertial tracking and optical/electromagnetic tracking) to get a high update rate of tracked positions.

The tracking data generally includes information about a position, an orientation, an acceleration, and a velocity. In the exemplary embodiment shown in FIG. 7, the movement of the user is a movement of the user's head. The tracking data is transmitted to filter 720 which filters the tracking data to remove peaks from the information about the position, the orientation, the acceleration, and the velocity of the user's head. This information indicates, whether the user's field of view changes as a result of the user's head being in motion, or if the user maintains her/his field of view by maintaining a steady gaze. The filter 720 outputs motion data which is transmitted to motion detector 730 and to quality advisor 740. The motion detector 730 detects whether the user, and in particular the user's head is in motion based on the motion data. If the user's head is in motion, the motion detector 730 transmits this information to the quality advisor 740. The quality advisor 740 also receives render statistics from FPS-Counter 770 and based on the render statistics, the motion data and the indication that the user's head is in motion, the quality advisor sets and adapts the rendering parameters to increase a frame rendering rate. If the user's head is not in motion (steady gaze), this information is transmitted to the image improver 750 which adapts the rendering parameters to increase a rendering quality and an image resolution of the image to be displayed on display 685, for example, which may be included in HMD 710.

FPS-Counter 770 generates render statistics by measuring a rendering time required for rendering the image from the volume data by renderer 760 which may be implemented as a Monte Carlo renderer. FPS-Counter 770 may measure the rendering time for each of a plurality of images, filter the rendering time to remove peaks, and include in the render statistics a number of rays through the volume data for each of the plurality of images. Thus, to provide a comfortable experience during motion, the quality of the rendering is lowered based on the motion data (e.g., velocity, acceleration) and based on current render statistics.

Rendering parameters for the Monte Carlo renderer 760 include a resolution of the image, a resolution of the volume data, a number of rays through the volume data, a size of a step along a ray through the volume data (ray-casting step-size, i.e., the number of steps for volume ray casting), and a number of light samples.

Figure 8:
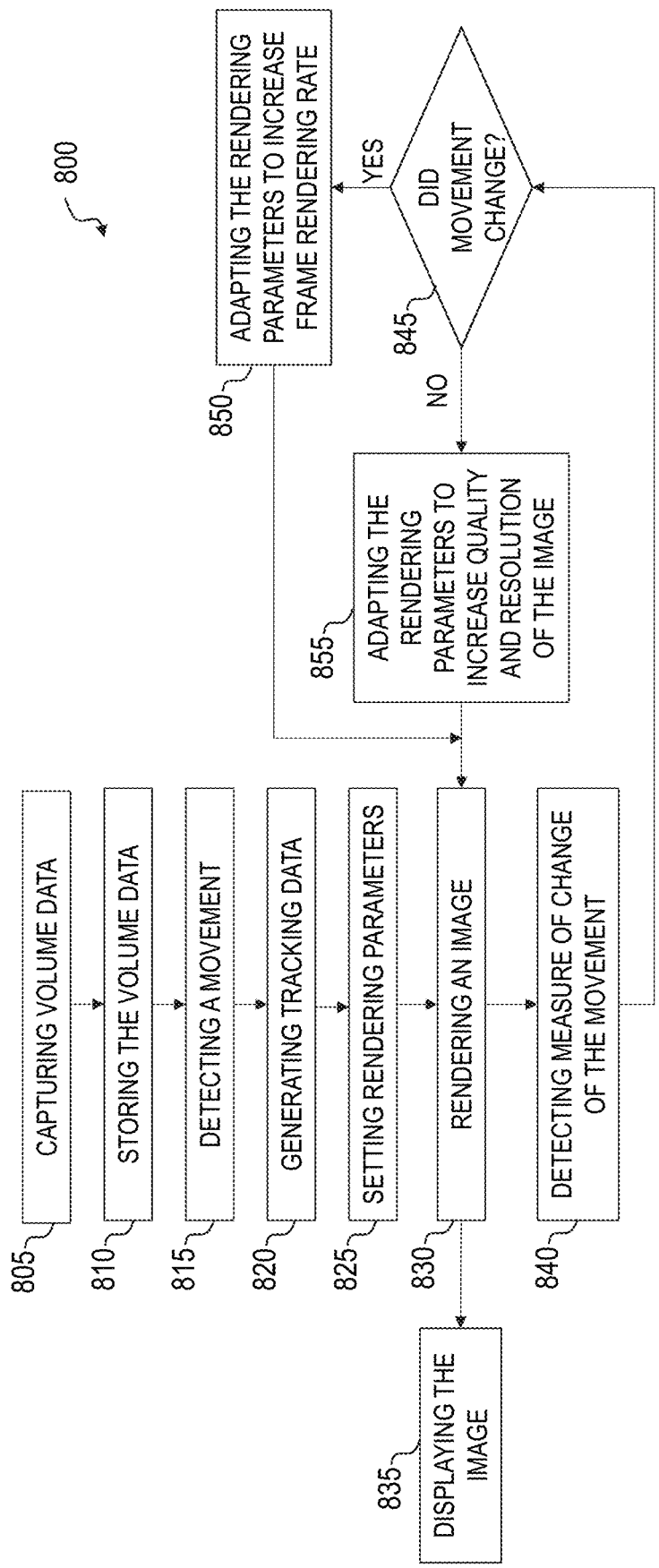
FIG. 8 shows a flow chart of a method for rendering an image in a virtual reality environment according to an exemplary embodiment of the disclosure.

Referring now to FIG. 8 (with continued reference to FIGS. 6 and 7), a flow chart is described of method 800 for rendering an image in a virtual reality environment.

Method 800 begins at 805 where volume data 650 is captured by capturing device 690. At 810, the volume data 650 is stored in memory 610. Method 800 continues to 815 at which a movement of a user is detected by tracking device 680 and at 820, tracking data representing the movement of the user is generated by tracking device 680. The tracking data is sensor data which includes information about a position, an orientation, an acceleration, and a velocity of a user's head, a user's body, or a user's hand, for example. The tracking data is utilized to control the quality and speed of the rendering by the rendering logic 665 (which may implement Monte Carlo renderer 760) in an adaptive manner.

At 825, rendering parameters are set by the parameter setting and adaptation logic 670 and at 830, an image is rendered from volume data 650 based on the rendering parameters. Quality and time for image rendering interrelate. High quality images require high computational effort. HMD devices, such as HMD 710 generally require high framerates for a comfortable experience. High quality images are a fundamental requirement to gain insight from 3D scientific data. However, it is difficult to achieve quality and required performance at the same time. According to an aspect of the disclosure, it is not an object to provide a steady framerate. Instead, it is an object to provide high quality images if the head gaze is steady and high performance if the head is in motion. The concept is based on the human vision system. In motion, humans are not able to recognize each individual detail. Hence, the image quality can be decreased and the frame rendering rate can be increased for a comfortable experience upon detecting, by the motion detector 730, for example, that the head is in motion. In steady poses, the human eye focuses on details and high quality images are required. Accordingly, the quality of the images and the resolution can be increased and the frame rendering rate can be decreased upon detecting that the user is not in motion, i.e., that the user has a steady gaze. This is not a problem because in steady poses a lower framerate is acceptable.

The image may be rendered at 830 by Monte Carlo integration. Monte Carlo integration is a special algorithm to solve integration problems in a numerical fashion. The rendering equation is an integral that defines how light is transported through the scene for each visible pixel. Monte-Carlo integration uses random numbers for evaluating the integrand. For each visible pixel (e.g., for each pixel in the stereo image) a view ray is shot through the scene. If the ray hits the volume, a random number is used to advance each ray by an offset to prevent discrete volume sampling artefacts (along the ray, the renderer steps uniformly through the volume and gathers the intensity value for each step. Based on this value, the color is computed. Based on the rendering mode, further lighting information is applied. This technique is called direct volume rendering. By accumulating several images over time, the statistical variance is eliminated and a high quality image is achieved. If global illumination is active, random variables for shadow and indirect light computation are utilized.

The crucial part is the stepping through the volume. To accelerate this process, two different techniques can be used:

a. Empty space skipping. Regions in the volume are skipped, which will not contribute to the final pixel color by utilizing acceleration structures. Well known structures for such approach are, but are not limited to, grids, octrees, or kd-trees. Elements in the structure represent a larger region and provide information for this region. Based on the information it can be decided if a region will contribute to the pixel color or not. If it contributes, the process steps with the ray through the region, otherwise the ray is advanced directly to the end of the region and continues with the adjacent region.

b. Early ray termination. The stepping through the volume is terminated upon determining that pixels will be completely opaque. In this case the next integration steps along the ray will not make any contribution to the pixel color. For performance reasons (during motion), random variables are used to terminate the ray stepping if a specific opacity has been reached.

The Monte Carlo renderer 760 may use the following parameters to control the quality and performance of the rendering:

a. A size of the output image: The size of the output image defines the number of pixels and hence the number of rays to shot.

b. A step size: The size of a step along a ray. Different step sizes are used for primary rays (view rays) and secondary rays (light, shadow and diffuse rays). Both are controlled by the quality advisor 740. Larger step sizes solve the integral much faster but the images lacks in details. Smaller step sizes require more computations but provide very detailed images.

c. A traverse depth: The number of recursive steps for lighting computation. This parameter is only necessary for global illumination. It controls the number of specular and diffuse reflections. A higher depth per pixel exponentially increase the computational effort.

d A lighting/shadow model.

At 835, the image is displayed on display 685. Method 800 continues to 840 at which a measure of the movement of the user based on the tracking data is detected. A major issue may be micro movements of the head. Therefore, the tracking data is filtered by filter 720 to smooth the sensor data for movement decision making before the measure of the movement of the user based on the tracking data is detected.

At 845, it is determined whether the movement of the user has changed. Upon determining, e.g., by motion detector 730, that the user is in motion, method 800 continues to 850 at which the rendering parameters are adapted to increase the frame rendering rate. Subsequently, method 800 returns to 830.

Upon determining at 845 that the user is not in motion, method 800 continues to 855 at which the rendering parameters are adapted to increase the rendering quality and the image resolution. Subsequently, method 800 returns to 830.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the exemplary embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method for rendering an image in a virtual reality environment, the method comprising:
   capturing volume data with a capturing device;
   storing the volume data in a memory;
   detecting a movement of a user with a tracking device;
   generating tracking data representing the movement of the user;
   setting rendering parameters for rendering the image;
   rendering the image from the volume data based on the rendering parameters;
   detecting a measure of the movement of the user based on the tracking data;
   generating motion data by filtering the tracking data to remove peaks from information in the tracking data;
   adapting the rendering parameters based on the motion data and depending on the measure of the movement of the user;
   generating render statistics by measuring a rendering time required for rendering the image from the volume data;
   detecting whether the user is in motion based on motion data, and
   adapting the rendering parameters based on the render statistics and a result of the detecting whether the user is in motion,
   wherein the information in the tracking data includes information about a position, an orientation, an acceleration, and a velocity, and
   wherein the measure of the movement of the user is a measure of a change of at least one of the position, the orientation, the acceleration, and the velocity.

2. The method of claim 1, further comprising:
   performing the rendering of the image based on the rendering parameters by solving a rendering equation, and solving the rendering equation by a Monte Carlo integration.

3. The method of claim 1, wherein the movement of the user is a movement of the user's head.

4. The method of claim 1, further comprising displaying the image on a display.

5. The method of claim 4, wherein:
   the image is a stereoscopic image,
   the display is a head-mounted display (HMD), and
   the HMD includes the tracking device.

6. The method of claim 1, wherein:
   the information in the tracking data includes information about a position, an orientation, an acceleration, and a velocity, and
   the measure of the movement of the user is a measure of a change of at least one of the position, the orientation, the acceleration, and the velocity.

7. The method of claim 6, wherein
   filtering the tracking data comprises removing peaks from the information about the position, the orientation, the acceleration, or the velocity.

8. The method of claim 7, further comprising:
   increasing a frame rendering rate upon detecting that the user is in motion, and
   increasing a rendering quality and an image resolution upon detecting that the user is not in motion,
   wherein the increasing of the frame rendering rate and the increasing of the rendering quality and of the image resolution are performed by adapting the rendering parameters.

9. The method of claim 7, wherein the generating of the render statistics comprises:
   measuring the rendering time for each of a plurality of images;
   filtering the rendering time to remove peaks from the rendering time, and
   including a number of rays through the volume data for each of the plurality of images in the render statistics.

10. The method of claim 7, wherein the increasing of the rendering quality and of the image resolution comprises:
    increasing a ray-casting accuracy;
    increasing a number of light samples; and
    superimposing the image with a plurality of images rendered before the rendering a current image.

11. The method of claim 1, wherein the capturing device is one of a microscope, a magnet resonance imaging (MRI) device, a computer tomography (CT) device, and an ultrasound scanning device.

12. The method of claim 1, wherein the rendering parameters include a resolution of the image, a resolution of the volume data, a number of rays through the volume data, a size of a step along a ray through the volume data, and a number of light samples.

13. A system for rendering an image in a virtual reality environment, the system comprising:
    a tracking device to detect a movement of a user and to generate tracking data representing the movement of the user;
    a capturing device to capture volume data;
    at least one communication interface in communication with the tracking device and the capturing device;
    a memory;
    a processor coupled to the at least one communication interface and the memory, wherein the processor:
    stores the volume data in a memory;
    sets rendering parameters for rendering the image;

renders the image from the volume data based on the rendering parameters;

detects a measure of a change of the movement of the user based on the tracking data;

generates motion data by filtering the tracking data to remove peaks from information in the tracking data;

adapts the rendering parameters based on the motion data and depending on the measure of the change of the movement of the user;

generates render statistics by measuring a rendering time required for rendering the image from the volume data;

detects whether the user is in motion based on motion data, and adapts the rendering parameters based on the render statistics and a result of the detecting whether the user is in motion, wherein the information in the tracking data includes information about a position, an orientation, an acceleration, and a velocity, and wherein the measure of the movement of the user is a measure of a change of at least one of the position, the orientation, the acceleration, and the velocity.

14. The system of claim 13, wherein the processor:

performs the rendering of the image based on the rendering parameters by solving a rendering equation, and solves the rendering equation by a Monte Carlo integration.

15. The system of claim 13, wherein the movement of the user is a movement of the user's head.

16. The system of claim 13, further comprising a display to display the image.

17. The system of claim 16, wherein:

the image is a stereoscopic image, the display is a head-mounted display (HMD), and the HMD includes the tracking device.

18. The system of claim 13, wherein:

the information in the tracking data includes information about a position, an orientation, an acceleration, and a velocity, the measure of the change of the movement of the user is a measure of a change of at least one of the position, the orientation, the acceleration, and the velocity, and the processor:

filters the tracking data to remove peaks from the information about the position, the orientation, the acceleration, or the velocity.

19. The system of claim 18, wherein the processor:

increases a frame rendering rate upon detecting that the user is in motion and a rendering quality and an image resolution upon detecting that the user is not in motion by adapting the rendering parameters, to generate the render statistics:

measures the rendering time for each of a plurality of images;

filters the rendering time to remove peaks from the rendering time, and includes a number of rays through the volume data for each of the plurality of images in the render statistics, and to increase the rendering quality and the image resolution:

increases a ray-casting accuracy, increases a number of light samples, and superimposes the image with a plurality of images rendered before rendering a current image.

20. The system of claim 13, wherein the rendering parameters include a resolution of the image, a resolution of the volume data, a number of rays through the volume data, a size of a step along a ray through the volume data, and a number of light samples.

* * * * *